Dec. 22, 1970 V. D. ELARDE 3,549,393
PRECISION TOLERANCE CERAMIC AND METHOD OF PREPARING SAME
Filed Aug. 8, 1966 2 Sheets-Sheet 1
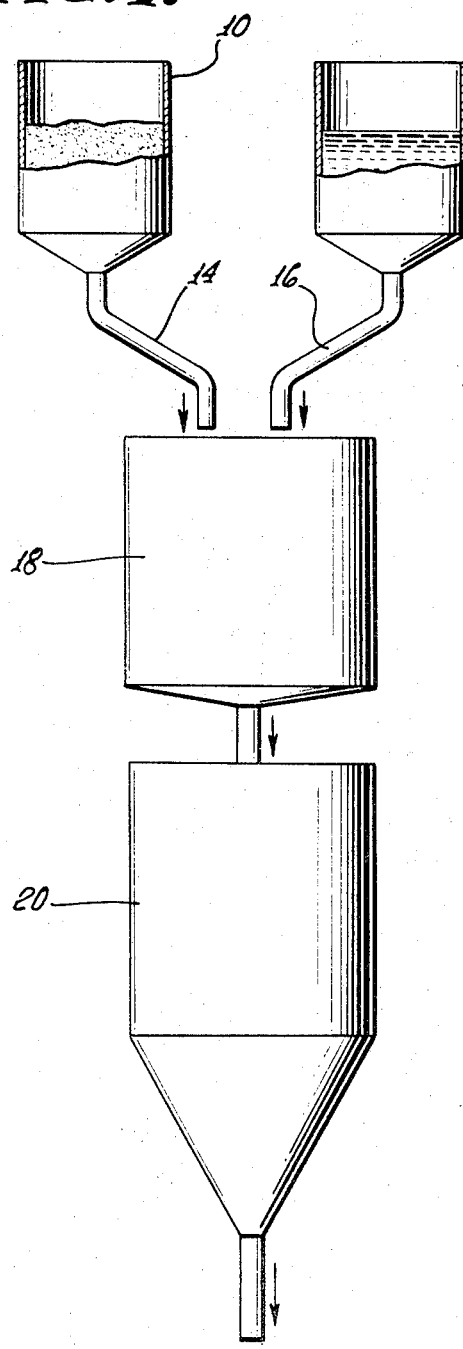
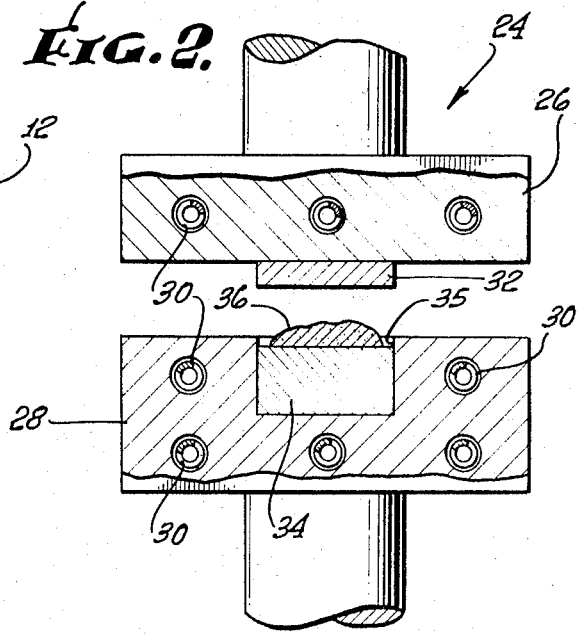
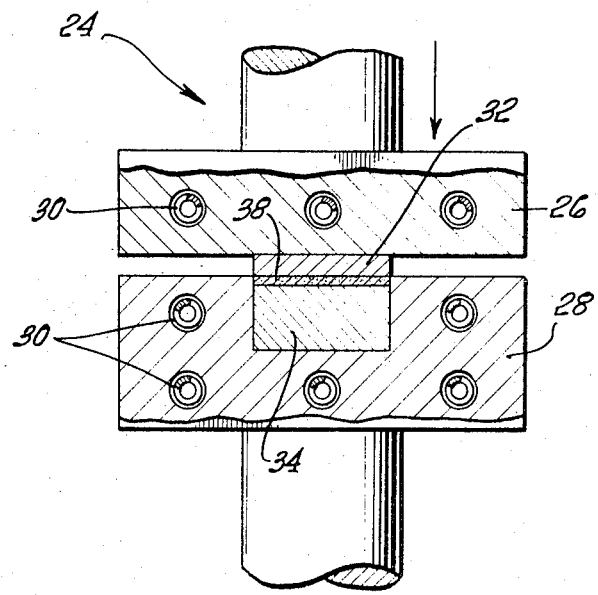
INVENTOR.
*Vito D. Elarde*
BY *Huebner & Worrel*
ATTORNEYS.

Dec. 22, 1970          V. D. ELARDE          3,549,393
PRECISION TOLERANCE CERAMIC AND METHOD OF PREPARING SAME
Filed Aug. 8, 1966                2 Sheets-Sheet 2
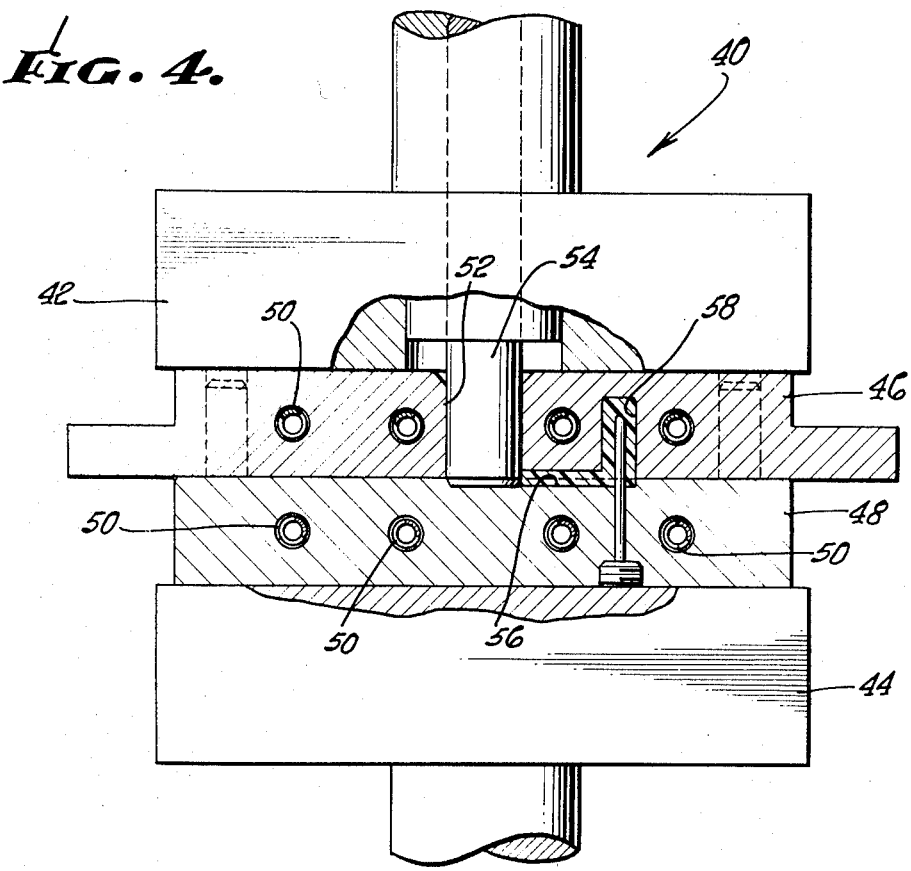
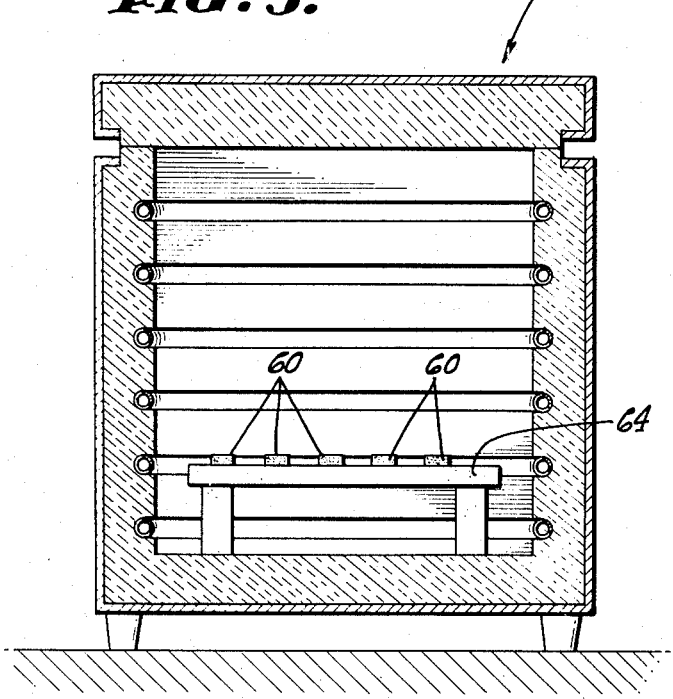
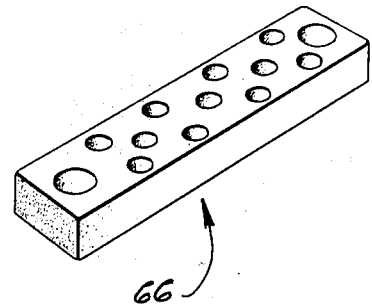
INVENTOR.
*Vito D. Elarde*
BY *Huebner & Worrel*
ATTORNEYS.

United States Patent Office 3,549,393
Patented Dec. 22, 1970

3,549,393
PRECISION TOLERANCE CERAMIC AND
METHOD OF PREPARING SAME
Vito D. Elarde, San Diego, Calif., assignor to Ceram Corporation, La Mesa, Calif., a corporation of California
Filed Aug. 8, 1966, Ser. No. 571,124
Int. Cl. C04b 35/00, 35/18
U.S. Cl. 106—39        12 Claims

ABSTRACT OF THE DISCLOSURE

A method of making ceramic articles of precise dimensions wherein a material portion of the particulate ceramic material which is to be fired is a sillimanite mineral such as Kyanite. After firing the article is heated under controlled temperature and time conditions so as to convert a part of the sillimanite material into mullite and silica, thereby expanding the article to a controlled extent, at least partially compensating for shrinkage which occurred in the firing. This allows precision ceramic articles to be formed before they are fired with conventional plastic molding procedures and equipment.

The present invention relates to ceramic materials and to methods of preparing the ceramic materials and making objects thereof, and the invention relates more particularly to a novel ceramic composition and method of making same and fabricating objects thereof, wheerin the dimensions can be accurately controlled and precision tolerance thereby achieved.

It is desirable and frequently necessary to make many structures of ceramic material because of its excellent qualities of heat resistance, dimensional stability, wear resistance and rigidity or hardness. For example, there is extensive requirement today for electrical connector insulator bodies, and numerous high temperature componnets for aircraft and missiles which are composed of ceramic material. However, prior to the present invention it has been extremely difficult and in many cases commercially impractical to produce parts of ceramic materials where close tolerances are required because of excessive and non-uniform shrinkage which occurs during the fabrication and firing of ceramic articles produced according to prior art methods and compositions. Thus, typically shrinkages of 10% to 20% occur during the firing operation. Usually in order to obtain lower shrinkages it was necessary to sacrifice vitrification.

There is a rapidly increasing need today for a material which can be molded or otherwise formed into intricate shapes, as for example many of the shapes into which plastics can be transfer or injection molded, but which material must be capable of withstanding temperatures in excess of present plastic or elastomer capabilities. For example, many intricate parts now required for military use which otherwise could have been composed of a plastic material must be capable of withstanding temperatures up to 1000° F. Electrical connector insulators for aircraft and missile use are typical examples of shapes which often must be intricate, and which conventionally have been molded or otherwise formed of plastics, but now which for many purposes must be capable of withstanding much higher temperatures than plastics. While many of such parts could ideally be composed of ceramic material, it has heretofore been very difficult and in general commercially impractical to produce them from ceramic material because in order to obtain relatively close tolerances it has generally been necessary after molding or forming and vitrification to then apply an additional and expensive secondary fabrication step of machining, which is particularly difficult with ceramics because of their hardness and abrasive qualities. In general, it has heretofore not been feasible to simply mold or form the ceramic materials in the same manner in which plastics could be molded or formed.

This problem is particularly emphasized by the fact that where parts that were formerly made of plastics must now be produced of ceramic materials, it would be very desirable for manufacturers to utilize the huge investment which many of them already have in tooling for molding the plastic parts; however, because of the excessive and uncontrolled shrinkage, it has heretofore not been possible to match in ceramic the amount of shrinkage of the plastics for which the plastic molds were designed. Thus, heretofore it has generally been necessary when switching from plastic to ceramic parts to provide entirely new tooling, despite the fact that the ultimate parts are to have the identical dimensions of the plastic parts.

In view of these and other problems in the art, it is an object of the present invention to provide a novel ceramic composition and method of preparing same wherein accurate dimensional control of ceramic parts is achieved without expensive machining and without sacrificing desired vitrification.

Another object of the invention is to provide a novel ceramic composition and method of preparing same of the character described wherein the amount of shrinkage of the ceramic during firing can be precisely controlled, and wherein if it is desirable the shrinkage can even be completely eliminated.

A further object of the invention is to provide a ceramic composition and method of preparing same of the character described wherein the ceramic may be mixed with a suitable binder and molded or otherwise formed much in the same manner as plastics, and even utilizing tooling employed for the molding of plastics, for fabricating various shapes, whether or not intricate, and the molded parts can then be fired to vitrification while matching the shrinkage of the corresponding plastic parts, whereby ceramic parts can be produced to the same dimensions as corresponding plastic parts on existing tooling for molding the plastic parts.

According to the present invention, a powdered mixture is provided comprising ceramic material, suitable fluxing means for ultimately accomplishing the vitrification, a suitable binder, preferably a silicone resin, but which may be some other resin or may under some circumstances be another type of binder such as a wax, and such ancillary ingredients as may be desired like pigment, and wax for better mold release. This powdered mixture is then formed by conventional means, using pressure and heat as required, by such conventional means as pressure molding, transfer molding, injection molding, cold pressing or extrusion, to produce parts of the desired configuration. The parts are then fired or heat treated in a carefully controlled cycle to first burn off or drive out all of the binder and other volatiles, to then vitrify the ceramic, and then finally to dimensionally adjust the articles by an expanding or re-expanding step. This final expanding step, after substantial vitrification, is the key factor in the present invention which provides the novel dimensional control of the present invention, and it is adjustable by the temperature and time of application of the final step of the firing, and is permitted by the inclusion of a novel ceramic ingredient, namely, one of the three polymorphic forms of the sillimanite group of minerals having the composition $Al_2O_3 \cdot SiO_2$, or $Al_2SiO_5$, the preferred one of these three forms at the present time being "Kyanite," which is more commercially available than the other two forms. This sillimanite material has a property when heated to the proper temperature of forming the refractory compound mullite ($3Al_2O_3 \cdot 2SiO_2$ or $Al_6Si_2O_{13}$) and silica, the silica appearing as a glass or some crystalline form of $SiO_2$. This conversion of the sillimanite material will normally occur at a temperature higher than the vitrification temperature of the ceramic, and the conversion results in an expansion of growing of the material. Thus although vitrification will inevitably involve a certain amount of shrinkage, the conversion of the sillimanite material to mullite and silica will cause an expansion or re-expansion, and such expansion can be accurately controlled according to the temperature applied and to the time of application of such temperature, thereby resulting in a close tolerance final dimension.

By this means, the present invention permits tolerances of plus or minus .001 inch per inch of the product to be maintained. Heretofore, it has not been commercially feasible to produce ceramic articles to tolerances closer than plus or minus .010 inch per inch of product, without adding expensive machining steps to the processing. Since the growth step employed in the present invention occurs normally at temperatures higher than those of vitrification, the resulting products will have excellent dimensional stability when subjected to high temperatures during usage, so long as the temperatures do not substantially approach vitrification temperatures.

Further objects and advantages of the present invention will appear during the course of the following part of this specification, wherein the details of the ingredients, mode of operation thereof and novel method steps of preferred embodiments are described with reference to the accompanying drawings, in which:

FIG. 1 is a diagrammatic view illustrating the preparation of a powdered composition including ceramic and binder ingredients which can be formed to shape by conventional plastic molding apparatus.

FIGS. 2 and 3 are elevational views, partly in section, illustrating pressure molding of a flat sheet of material from the powdered composition prepared according to the illustration of FIG. 1.

FIG. 4 is an elevational view, partly in vertical section, illustrating the transfer molding or injection molding of an article from the powdered composition of ceramic and binder materials.

FIG. 5 is a vertical section, partly in elevation, illustrating the application of the heating cycle of the present invention in a suitable oven to molded articles in order to produce the final ceramic articles of the invention.

FIG. 6 is a perspective view showing a ceramic electrical connector insulator which has been fabricated according to the present invention.

A first step of the invention is to provide a moldable or formable mixture of powdered ceramic ingredients and a suitable binder, such that the mixture can be molded or otherwise formed in the same manner as a plastic. The preparation of this moldable mixture is illustrated schematically in FIG. 1 of the drawings, which shows the ceramic powder, including the fluxing means therefor, as well as pigment if this is to be included, disposed in a container 10, and a liquid solution or dispersion of the binder material, and also preferably of wax as a lubricant or mold release, in a container 12. The powder from container 10 and the liquid from container 12 are fed through suitable conduits 14 and 16, respectively, into a mixer 18 in which they are thoroughly mixed to provide a uniform liquid suspension thereof, and this mixture is then dried and provided in a particulate form suitable for molding. A convenient means for accomplishing the drying is a spray drier 20 which produces the mixture in a powdered form, which is then dispensed into a suitable bin 22.

It is to be understood that any suitable means may be employed for providing an intimate mixture of binder and ceramic powders within the scope of the present invention, and the material for molding may be in powdered, granular or pelletized form, as desired.

The binder material may be any one of a number of different types of binders, according to the type of forming which is to be employed, such as pressure molding, transfer molding, injection molding, cold pressing or extrusion. For example, if the intermediate fabricating step is to be performed by transfer molding, a thermosetting resin will be employed as the binder. Suitable thermosetting resins, to which the present invention is not necessarily limited, include silicone, phenolic, diallyl phthalate, alkyd and epoxy resins. Of this group, silicone is the presently preferred thermosetting resin, because when it is fired, part of it converts to a ceramic material, silicon, and the rest, being organic, burns off. This minimizes the volatile content, and thereby minimizes shrinkage during firing.

If the forming is to be accomplished by injection molding, then a thermoplastic resin will be employed as the binder. Examples of suitable thermoplastics, to which the present invention is not necessarily limited, are polyethylene, polyvinyl chloride (PVC) and "nylon."

If the forming process is to include extrusion, it is preferred to utilize an elastomer binder composition.

If the intermediate fabricating step is to be by cold pressing then a wax emulsion binder may be substituted for the resin type of binder.

Where a resin binder is employed, any suitable solvent or extender can be employed to put it in liquid form for mixing with the ceramic powder. Most commercial resins are provided in a xylene or toluene solution which is satisfactory. If a non-flammable solution is desired, chlorethylene may be employed as the solvent.

It is to be understood, however, that the provision of the resin binder in solution is presently preferred as a convenient means for handling the resin, but that in practicing the present invention the binder could be intimately mixed with the ceramic powder in dry form, can be mixed in a solvent as illustrated in FIG. 1, or can be in the form of an emulsion.

The sillimanite material which is the expanding part of the ceramic material, may comprise any desired portion of the total ceramic material within the scope of the invention. Thus, a sillimanite has been effectively employed ranging from less than 10% of the total ceramic material all of the way to 100% of the total ceramic material, with regrowth characteristics being present in the final heating step for accurate tolerance control. Where a relatively large percentage of the ceramic material is the sillimanite, then a relatively large amount of regrowth, or even expansion over the original size, may be provided relatively quickly without a large increase of temperature over and above the temperature at which the regrowth commences. However, where only a small percentage of the ceramic material is the sillimanite, then the amount of regrowth will be correspondingly reduced for a given temperature rise above the initial point of regrowth activity, and to provide substantial regrowth a greater increase in temperature will be required. If only a small percentage of the ceramic material is from the sillimanite group, then the finished, vitrified article will be somewhat shrunk from the initial size. However, the amount of shrinkage can be controlled by the capability of regrowth or re-expansion that is provided by the presence of even a small amount of the sillimanite material.

The three polymorphic forms of the sillimanite group of minerals which are ceramics having the regrowth characteristics required for the present invention include (1) Sillimanite, also known as Fibrolite; (2) Kyanite, also known as Cyanite and Disthene; and (3) Andalusite, special varieties of which are known as Chiastolite and Viridine. The Kyanite is preferred because of commercial availability.

Other ceramic materials which may be included as a part of the ceramic combination are alumina ($Al_2O_3$), zircon ($ZrSiO_4$), and titanium dioxide, although it is to be understood that any other suitable ceramic material can be employed with the sillimanite material.

The Kyanite or other sillimanite material is provided preferably in the particle size range of from 35 to 425 mesh, although the particle size is not critical. If another ceramic material is combined with the Kyanite, a good particle size range for such other ceramic material is from 100 to 425 mesh, with coarser particles providing easier flow but reducing the quality of the surface finish. Also, the finer the mesh, the lower the shrinkage of the the ceramic when fired.

The fluxing means is preferably a combination of fluxing agents which may have particle sizes anywhere from about 35 mesh all of the way down to about 10 microns. One particularly useful fluxing agent to include in the formula is lead silicate type glass, such as No. E-1432 W. G. Flux provided by Drakenfeld Company. This flux begins to become effective at about 1200° F. or lower, so as to help bind the ceramic material together during the heating cycle when the resin binder is being driven off. This lead silicate type of flux also appears to function as a catalyst for polymerization of the resin binder during the intermediate fabricating stage of the process, and this material has the peculiar advantage as a catalytic agent that its catalytic action is easily and accurately controlled in the process. On the other hand, if some other fluxing agent is employed, and standard separate accelerators are employed for polymerizing the resin, it is frequently very difficult to control polymerization to the proper extent because of the temperature and pressure variations involved in the intermediate fabricating stage of the process. One problem with separate catalysts is that it is difficult to avoid obtaining tighter polymerization than can be obtained by using the lead silicate glass, with a resulting increase in shrinkage.

Another useful fluxing agent to include in the fluxing means is magnesium oxide (MgO). Another desirable fluxing agent to include in the fluxing means is silica. A further fluxing agent which is desirable to include as a part of the fluxing means is E.P.K. China clay, which not only functions as a part of the fluxing means, but which also assists in flowability during the molding operation. A preferred amount of the E.P.K. China clay to include ranges from about 1% to about 5% of the total solids content to be molded, including the resin.

A suitable pigment may be included in the formulation if desired, but is not necessary.

A further ingredient which is desirable to include is beeswax, as a lubricant and for good separation of the parts from the mold. The beeswax is preferably included in an amount ranging from about ½% to about 2% of the total solids content, including the resin.

Further with respect to particle size, it is to be noted that generally the coarser the particles in the formulation, the better will be the ultimate crack resistance of the finished ceramic. Another factor as to particle size is that the sillimanite material will have more growth for the same weight thereof the finer the mesh.

The following are some formulations which have been found to be particularly effective for producing the mixture that is to be formed or molded to provide the intermediate structure that will be fired to produce the final ceramic structure:

FORMULA 1

| Material: | Parts by weight |
|---|---|
| Silicone resin (solids content) | 14 |
| Alumina | 30 |
| Kyanite | 30 |
| Lead silicate glass | 17 |
| Silica | 7 |
| Magnesium oxide | 5 |
| E.P.K. China clay | 3 |
| GS 100 pigment | 2 |
| Beeswax | ½ |

FORMULA 2

| Material: | Parts by weight |
|---|---|
| Silicone resin (solids content) | 14 |
| Kyanite | 25 |
| Zircon | 35 |
| Lead silicate glass | 17 |
| Silica | 10 |
| Magnesium oxide | 8 |
| E.P.K. China clay | 3 |
| Chromium oxide pigment | 2 |
| Beeswax | ½ |

FORMULA 3

| Material: | Parts by weight |
|---|---|
| Silicone resin (solids content) | 14 |
| Titanium oxide | 30 |
| Kyanite | 35 |
| Lead silicate glass | 17 |
| Silica | 10 |
| E.P.K. China clay | 3 |
| Beeswax | ½ |

FORMULA 4

| Material: | Parts by weight |
|---|---|
| Silicone resin (solids content) | 14 |
| Kyanite | 60 |
| Lead silicate glass | 17 |
| Silica | 7 |
| Magnesium oxide | 5 |
| E.P.K. China clay | 3 |
| GS 100 pigment | 2 |
| Beeswax | ½ |

It will be noted that Formulas 1, 2, 3 and 4 each include silicone resin as the binder. Although any source of silicone resin may be employed, one source which has been found effective is Resin No. 4281 provided by Dow Corning. Since silicone resin is a thermosetting resin, the above formulations will be employed principally in pressure molding and transfer molding for the intermediate fabricating step to provide a molded article. In pressure molding and transfer molding, temperatures will normally range from about 270° F. to about 400° F., and the compression time will normally range from about 1 minute for small parts to about 10 to 15 minutes for relatively large parts. Such factors as time, temperature and pressure in the transfer or compression molding are factors which can be readily established by one having ordinary skill in the plastic molding art.

A thermosetting material such as silicone resin can alternatively be employed as a binder according to the present invention by applying only such pressure and heat as are required to produce sufficient flowability for the forming process in a preliminary or input chamber before introduction of the composition into the actual mold chamber. Then, rather than using a hot mold as in transfer molding, wherein the heat of the mold normally produces polymerization or curing of the resin, a die or mold is employed which is cooler than the said preliminary or input chamber where flowability is produced. Then, when the flowable material is injected into the mold or die chamber, the material will again be made rigid, and there will be sufficient binding action normally to produce a part which will maintain its shape and be workable for the further processing to produce the final ceramic part. In this case, a low temperature thermoplastic capability of the thermosetting resin is being employed to obtain the binding.

The intermediate fabricated part can also be produced by cold pressing if desired. In this case, a binding wax replaces the resin, and the bond is effected by pressure without requiring substantial heat. A suitable wax binder, to which the invention is not in any way limited, is American Cyanamid's Hyform 1201 wax emulsion, which contains 40% wax solids in water. Several formulations which have been satisfactorily employed in dry pressing are as follows:

FORMULA 5

| Material: | Parts by weight |
|---|---|
| Wax emulsion (total content) | 14 |
| Kyanite | 30 |
| Zircon | 20 |
| Lead silicate glass | 15 |
| Magnesium oxide | 5 |
| Silica | 10 |
| E.P.K. China clay | 3 |

FORMULA 6

| Material: | Parts by weight |
|---|---|
| Wax emulsion (total content) | 14 |
| Zircon | 40 |
| Kyanite | 10 |
| Lead silicate glass | 17 |
| Silica | 10 |
| Magnesium oxide | 5 |
| E.P.K. China clay | 3 |

It will be noted that the Kyanite content in Formula 5 is considerably larger than that in Formula 6. Because of this, there will be considerably more growth of the ceramic in the final heating step with Formula 5 than with Formula 6. However, there is sufficient expansion or growth with Formula 6 to provide accurate control of the tolerance, while at the same time the lesser expansion results in an end product ceramic which is more dense with Formula 6, to the extent that the ceramic of Formula 6 is a gas-tight body.

It will be noted that several different ceramic materials have been employed in combination with the Kyanite in the formulations set forth in detail herein. These different ceramic materials permit variation of the physical properties according to certain desired characteristics. For example, the alumina ceramic material included in Formula 1 has extremely hard and abrasive characteristics, if such are desired. However, such abrasive characteristics provide relatively rapid mold wear. In contrast, the zircon ceramic material employed in Formulas 2, 5 and 6 is considerably softer than alumina, and therefore causes much less mold wear. Nevertheless, there is no substantial loss in the strength of the ultimate product, because the strength of the ceramic is determined essentially by the strength of the flux system employed therein, which serves as an inorganic binder system. The titanium dioxide ceramic material employed in Formula 3 is particularly useful for high temperature electrical capacitors, since it provides a high dielectric constant to the ceramic material.

Referring again to the drawings, and at this time to FIGS. 2 and 3, these figures illustrate pressure molding of the powdered composition of the present invention to produce a molded sheet of material as the intermediate fabricated part. The pressure molding apparatus is generally designated 24, and includes upper and lower platens 26 and 28, respectively, which are heated by suitable means, such as by heating elements 30 which may comprise electrically energized heating rods that extend through the platens. Upper and lower mold members 32 and 34, respectively, form a sheet mold, having flat, parallel opposed surfaces. The lower mold member 34 is somewhat recessed in the lower platen 28 to provide the compression cavity 35 within which a measured amount of the molding compound 36 is poured, this molding compound comprising the powdered or pelletized ceramic-binder composition of the present invention as heretofore described. In the case of compression molding, the binder preferably will comprise a thermo-setting resin. The mold members 32 and 34 are compressed together to form the molded sheet 38 as illustrated in FIG. 3, with the factors of pressure, molding temperature and molding time depending upon the particular composition and thickness, and these being factors within the ordinary skill of those in the plastic molding art. The sheet 38 may be ejected from the mold by any conventional means (not shown).

Compression molding will normally be employed only where relatively simple part configurations are being produced, such as sheets, discs, simple electrical connector insulators and the like. Similarly, where cold pressing is employed to fabricate the intermediate structure, employing a wax binder or the like as for example with Formulas 5 and 6, the intermediate fabricated parts produced would be of similar relatively simple configuration.

Referring now to FIG. 4, this figure principally illustrates the production of an intermediate fabricated part of the present invention by transfer molding. The molding apparatus is generally designated 40, and includes upper and lower platens 42 and 44, respectively, which carry upper and lower mold members 46 and 48 which are heated by suitable heating elements 50. The upper mold member 46 is provided with a cylindrical transfer cavity 52 within which a measured quantity of the ceramic-binder composition of the present invention is poured, as for example any of the compositions according to Formulas 1, 2, 3 and 4 set forth hereinabove. Pressure is applied by means of transfer ram 54, thereby forcing the material through a suitable transfer passage or gate means 56 into the mold cavity 58, wherein the pressure and elevated temperature are applied to the material for a sufficient time to produce the necessary binder strength for removing the part from the mold without damage, removing any flashing from the part, sanding or otherwise working the part to modify the shape thereof, and maintaining the desired configuration of the part during the heating cycle until such time as sufficient initial vitrification has occurred to take over the binding function.

The molding temperature, time and pressure will again depend upon the particular composition, configuration and size of the part, and these factors can be determined by one having ordinary skill in the molding art. In general, for larger parts the temperature is reduced and the time extended so as to extend polymerization of the resin throughout the part. Molding temperatures will normally be in the range of from about 270° F. to about 400° F., and the molding time will generally run from about 1 minute to about 15 minutes to provide an adequate cure cycle. Generally the ceramic-resin combination employed with the present invention will flow better than plastics which are conventionally molded, in transfer molding.

A mold arrangement generally similar to that illustrated in FIG. 4 can be employed for injection molding. However, with injection molding a thermoplastic resin is employed, and the composition is heated in the entry chamber prior to injection, cooling and setting up in the mold cavity. Again, the temperature, pressure and time allowed for hardening can be determined by those having ordinary skill in the plastics art. In general, it has been found that temperatures on the order of from about 350° F. to 450° F. are satisfactory for softening the composition preparatory to injection molding.

In transfer molding with the present composition, although the temperatures and pressures are in general quite similar to those employed with conventional plastic molding, it has been found that satisfactory results can normally be produced with pressures and temperatures that are somewhat lower than are required in most cases for conventional plastic molding.

The intermediate fabricated or molded parts 60 are then placed in a suitable oven or kiln 62 for application of the heating cycle thereto. The parts 60 will be disposed in the oven on suitable setter plates 64, which may be made of alumina, zirconia, silicon carbide or other suitable material capable of withstanding the temperatures that will be applied.

FIG. 6 illustrates a typical completed part after application of the heating cycle, in this case a high temperature ceramic electrical connector insulator 66. This particular product is shown by way of illustration only, and it will be understood that it may comprise any product which heretofore could be molded in plastic.

The heating comprises a first phase wherein all of the binders and organics are burned off or volatilized; a second phase wherein at least one of the fluxes commences functioning as an intermediate binder prior to completion of the first phase and continues to hold the configuration until vitrification occurs; a third phase during which the fluxes react to produce vitrification, melting and sealing substantially all of the pores where the organics had previously been located prior to being driven off, substantial shrinkage generally occurring in this third, vitrification phase; and a fourth and final phase wherein the accurately controlled growth is accomplished. It is important to note that the final or fourth phase of the heating cycle wherein the growth occurs comes after the third or vitrification stage, with its accompanying shrinkage, has been substantially completed; this permits the tolerance control applied in the final stage to be highly accurate, as it is substantially unimpaired by further vitrification.

Starting at room temperature, in the first phase of the heating cycle the part is gradually heated up to about 1200° F., at which temperature it is held for a substantial period of time. The binder is gradually burned off as the temperature is elevated from room temperature to 1200° F. with a silicone resin as the binder, it will commence burning off as the temperature of the part goes over about 600° F. With relatively small parts, as for example, parts having a cross-sectional thickness of about ⅛″ or less, it is preferred to raise the temperature from room temperature at a rate of about 100° F. per hour until about 1200° F. is reached, and then to hold the temperature at about 1200° F. for about ten hours. By holding the temperature at about 1200° F., time is allowed for substantially all of the organics and binder materials, i.e., all of the volatiles, to be driven out of the body, which becomes a porous body as the binder and volatiles are driven out. The temperature is elevated slowly through this first phase of the heating cycle to avoid cracking due to uneven thermal expansion or due to additional polymerization of the resin over and above that which occurred during the fabrication of the intermediate part as by molding.

For larger parts, as for example parts over ⅛″ thick, a slower rate of increase of the temperature is employed during the first phase of the heating cycle. For example, with a part on the order of ½″ thick, a typical sequence for the prefiring burnoff of the first phase would be to apply a temperature of 300° F. for four hours, 400° F. for another four hours, 500° F. for a further sixteen hours, 600° F. for a further twenty-four hours, 700° F. for a still further twenty hours, and then to allow the part to cool to room temperature for handling and then to go through the same sequence as with small parts; i.e., to elevate the temperature about 100° F. per hour up to about 1200° F., and then ot hold the temperature at about 1200° F. for about ten hours. Thus, for relatively large parts, an added heating sequence is preferably applied prior to the first phase heating sequence as applied to relatively small parts; namely, the sequence between 300° F. and 700° F. for extended intervals of time. This added sequence provides a preliminary burnout fully curing the part to stability to prevent any distortion of the configuration of the molded part.

The second phase of the heating cycle involves elevating the temperature of the part from about 1200° F. up to vitrification temperature, which will be on the order of about 2000° F. to 2100° F. During this second phase of the heating cycle the flux system is sufficiently effective to secure the stable shape of the part, even though vitrification as such has not truly begun. Actually, the flux commences to become effective at about 1200° F. or below to secure the configuration of the part, and accordingly the first and second phases of the heating cycle can be considered as somewhat overlapping. Accordingly, by the time the burnoff of the volatiles has been completed, there is sufficient flux activity to hold the shape of the part. The lead silicate glass fraction of the flux system is believed to be primarily responsible for this low temperature fluxing activity. The temperature is not required to be held at the vitrification point, but may be continuously elevated through the vitrification stage until it reaches the required temperature for the fourth phase of the heating cycle, namely, the growth phase.

A typical vitrification temperature for ceramics according to the present invention is about 2100° F., and as the ceramic becomes vitrified a certain amount of shrinkage will occur. By using the preferred silicone type of resin binder which, upon decomposing during the first phase of the heating cycle, leaves the inorganic residue silica, the amount of shrinkage, and the resulting amount of voids present in the ceramic, will be materially reduced from what it is with other resin binders.

Where Kyanite is the material from the sillimanite group that is employed in the composition, the threshold for growth is about 2150° F., and the preferred temperature range for the growth is from about 2150° F. to about 2250° F. The amount of growth becomes greatly increased with higher temperatures, and such higher temperatures will normally only be employed where a relatively small percentage of Kyanite is employed in the composition. Temperatures up to about 2500° F. can be utilized if necessary.

It is preferred to employ a growth temperature wherein the growth is relatively slow, and to then hold such temperature for a sufficient period of time to allow the growth to reach the exact point desired.

With a formula similar to Formula 1 set forth hereinabove, when the temperature is held at about 2200° F. for the growth phase of the heating cycle, there will be an initial surge of growth during the first hour of between about .005 and .010 inch per inch of the part, and then the growth will stabilize to the order of about .001 inch per inch of the part per hour. In typical parts produced according to Formula No. 1 set forth hereinabove, where a firing temperature of about 2100° F. for vitrification caused a shrinkage of about 2½%, when the temperature was raised to about 2200° F. for two hours in the final, growth phase of the heating cycle, the shrinkage was reduced to about 1¾%. Heating for an additional two hours at 2200° F. reduced the shrinkage further to about 1¼%. An additional two hours at about 2200° F. reduced the shrinkage still further to less than 1%.

Employing a formula similar to Formula 1 set forth hereinabove, and utilizing a growth temperature of about 2300° F., parts with zero shrinkage have been produced. Such zero shrink is calculated from the die or mold cavity to the final fired part. It is to be noted that the molded compound must, and does, shrink a certain amount when it is molded, in order that it may be removed from the mold. Such is also the case for conventional molded plastic parts. However, when the parts of the present invention are fired to vitrification, as with any ceramic part, there is a further shrinkage, which will cause shrinkage of the part to a smaller size than the size of a conventional plastic part produced in the same mold. The present invention, by means of the further growth step, permits the final fired ceramic part to be grown back to substantially the exact same size as a conventional plastic part which was molded in the same mold. By this means, present plastic tooling can be employed to produce ceramic parts with precise tolerances by employing the present invention.

Even after parts made according to the present invention have been cooled after firing, if it is desirable to further increase the size thereof, an additional growth step can be applied by raising the temperature again to the growth temperature, and applying it for a period of time sufficient to incur the further growth. This permits a group of parts to be made according to the invention, and after they have cooled and are measured, and if some fall short of the necessary dimensions, these can be again fired to the growth temperature and grown to the desired size.

During the fourth or growth phase of the heating cycle, the conversion of the sillimanite material, such as Kyanite, to mullite results in a change in the crystalline structure to a larger size crystal, with the lowering of the specific gravity thereof, and as a part of the conversion silica is given off. This silica which is given off at the final high temperature of the firing appears to cooperate in finishing the article as a fluxing agent, in that as the growth is occurring, the silica is given off in intimate association with the growing particles, and it appears to assist in sealing the growing particles together. The closeness of the silica to the growing particles thus appears to provide a better fluxing and sealing action than can be accomplished by the separately added flux.

It will be apparent from the foregoing that the key to the present invention is the final, controlled growth step which provides accurate dimensional control over the parts, and that the configuration of the parts can be established by any desired means.

By employing conventional molding practices to produce the intermediate fabricated part, and by having the final capability of growth to a precision tolerance, not only can standard plastic molds be employed, but also the intermediate fabricated parts can easily be sanded or machined or otherwise worked, because working at this time is simply like working a plastic, rather than trying to work a final, very hard ceramic part. Accordingly, virtually anything which can be made in plastic can be made to similar, and sometimes closer, tolerances by means of the present invention.

In general, the quantity of binder material that is employed with the ceramic powders of the present invention is determined by the requirement that there be sufficient binder to provide satisfactory flow during molding and stability of the molded part.

Parts which are made according to the present invention have been found in practice to be highly stable under all conditions of temperature up to about 2000° F. This is sufficient for practically all ceramic requirements at the present time. For example, the bulk of the military ceramic requirements now only require stability up to about 1000° F.

While the instant invention has been shown and described herein in what are conceived to be the most practical and presently preferred embodiments, it is recognized that departures may be made therefrom within the scope of the invention, which is therefore not to be limited to the details disclosed herein, but is to be accorded the full scope of the claims.

I claim:

1. The method of making a ceramic article which comprises the steps of taking a quantity of particulate composition which, upon firing, will bond together as a rigid ceramic body, a material portion of said particulate composition being at least one substance selected from the group consisting of the sillimanite minerals, forming said quantity of particulate composition to the general shape of said article, firing said formed article to produce a ceramic bond between adjacent particles therein, heating said fired article at a sufficient temperature and for a sufficient period of time to convert a substantial portion of said sillimanite substance to mullite and silica so as to cause substantial expansion of said article, and controlling the extent of said heating to stop said conversion prior to substantial completion thereof so as to control the extent of said expansion.

2. The method of claim 1, wherein said sillimanite substance is Kyanite.

3. The method of claim 1, wherein the temperature of said heating step is in the range of from about 2150° F. to about 2500° F.

4. The method of claim 1, wherein the temperature of said heating step is in the range of from about 2150° F. to about 2250° F.

5. The method of claim 1, wherein said particulate composition includes an organic binder material, and said binder material is burned off in an initial heating step prior to said firing.

6. The method of claim 5, wherein said binder material comprises a thermosetting resin.

7. The method of claim 6, wherein said forming is accomplished by transfer molding.

8. The method of claim 6, wherein said forming is accomplished by pressure molding.

9. The method of claim 5, wherein said binder material comprises a thermoplastic resin.

10. The method of claim 9, wherein said forming is accomplished by injection molding.

11. The method of claim 5, wherein said binder material comprises wax.

12. The method of claim 11, wherein said forming is accomplished by cold pressing.

References Cited

UNITED STATES PATENTS

| | | | |
|---|---|---|---|
| 3,389,001 | 6/1968 | Blackburn et al. | 106—67 |
| 2,641,044 | 6/1953 | Bearer | 106—65 |
| 2,803,554 | 8/1957 | Fenity et al. | 106—39 |
| 3,090,691 | 5/1963 | Weyer | 106—39 |

FOREIGN PATENTS

| | | | |
|---|---|---|---|
| 832,280 | 4/1960 | Great Britain | 106—67 |

JAMES E. POER, Primary Examiner

U.S. Cl. X.R.

106—57, 65, 67, 68